Dec. 16, 1958 J. F. SAUER 2,864,410
TANDEM VALVE ARRANGEMENT FOR USE WITH
AN EDUCTOR DEFUELING SYSTEM
Filed June 28, 1956 2 Sheets-Sheet 1
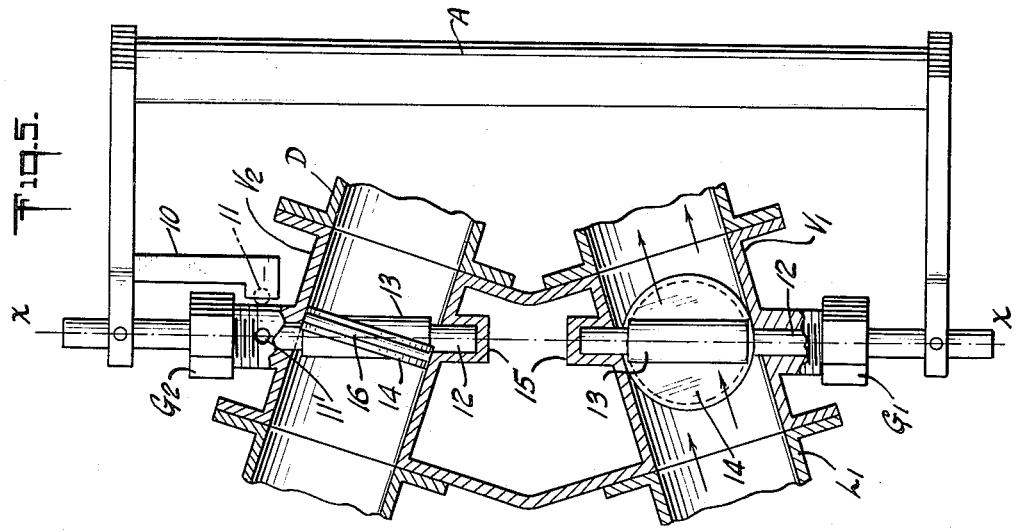
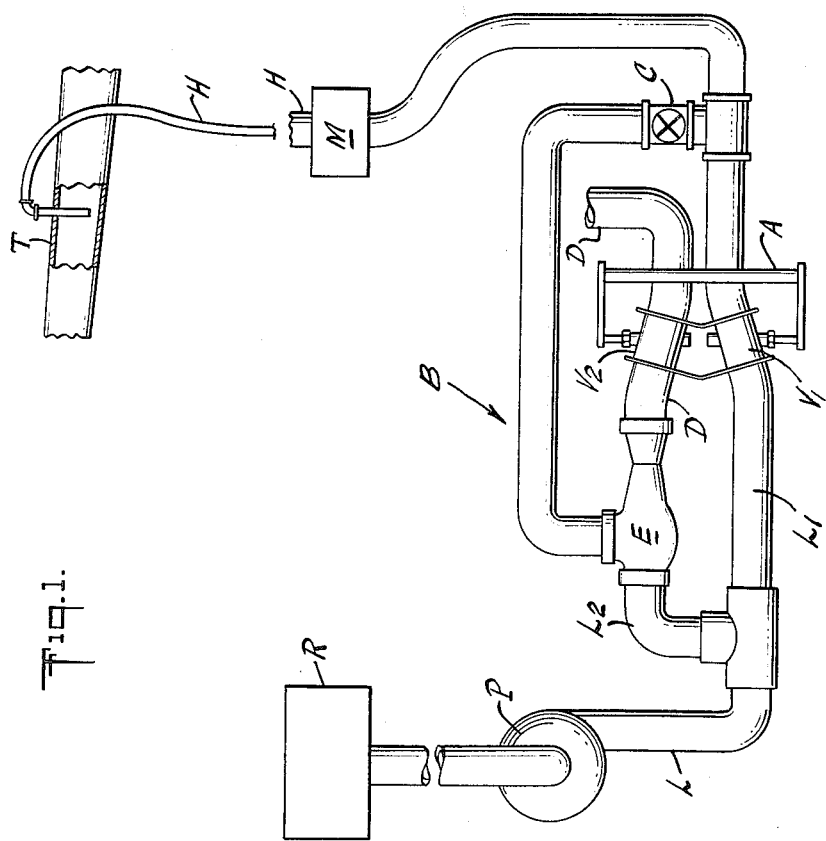

Dec. 16, 1958  J. F. SAUER  2,864,410
TANDEM VALVE ARRANGEMENT FOR USE WITH
AN EDUCTOR DEFUELING SYSTEM
Filed June 28, 1956  2 Sheets-Sheet 2
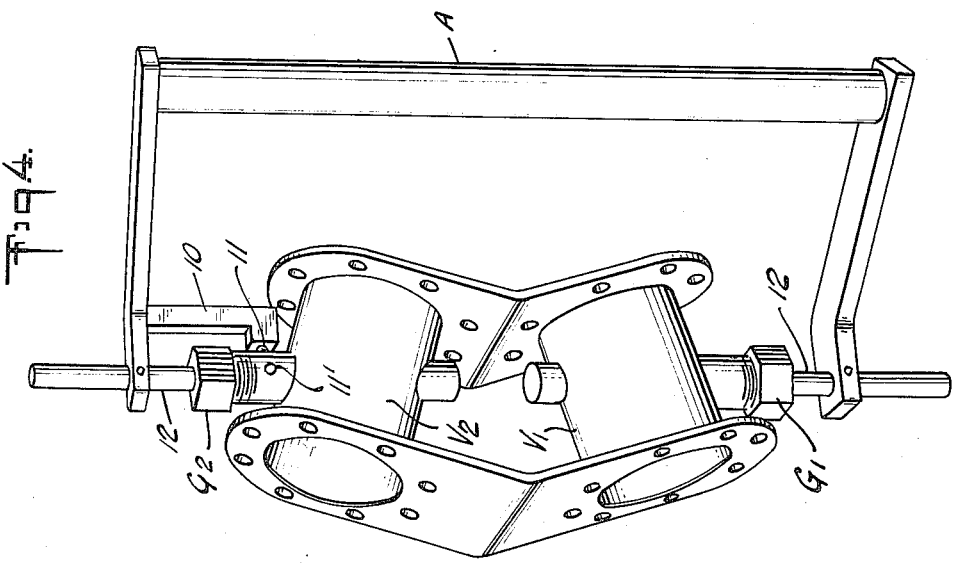
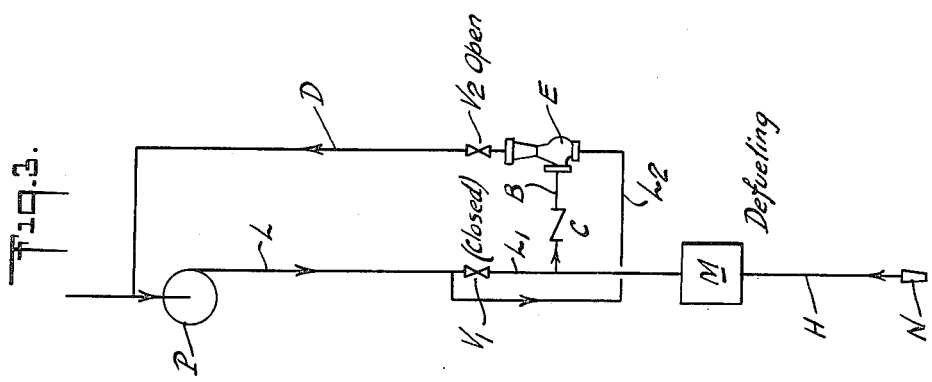
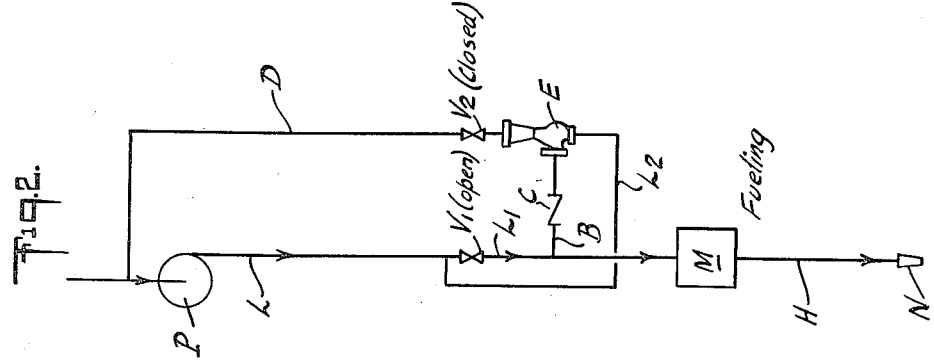

United States Patent Office

2,864,410
Patented Dec. 16, 1958

2,864,410

TANDEM VALVE ARRANGEMENT FOR USE WITH AN EDUCTOR DEFUELING SYSTEM

John Fred Sauer, Cedar Grove, N. J., assignor to The Texas Company, New York, N. Y., a corporation of Delaware Application June 28, 1956, Serial No. 594,596

4 Claims. (Cl. 141—119)

This invention relates generally to a dispensing apparatus and more particularly to a tandem valve arrangement for use in a fuel dispensing system for aircraft refueling operations.

In the servicing of aircraft, the quantity of fuel furnished an airplane is predetermined in accordance with the load and fuel requirements for each particular flight. As it frequently occurs, an excess of fuel, such as high octane gasoline, may be pumped into the tanks of the airplane, so that a withdrawal of a specific quantity of fuel must be made to satisfy the weight-load conditions. Although various piping and valve arrangements by which such loading and unloading may be accomplished are known from the prior art, the requirement for expeditious fuel servicing of airplanes remains, together with the inherent danger present in the handling of the highly inflammable fuel, which in itself necessitates an exceedingly rapid operation of the valves to accomplish the fueling desired. When such valve arrangements are manually operated, there is a problem of simultaneous opening and closing of quick-acting valves to avoid a needless variation in the loading and unloading of the fuel.

Accordingly, it is an object of the present invention to provide a novel dispensing apparatus for fueling and defueling of aircraft which is simple, quick-acting in operation and safe.

It is another object of the invention to provide a fuel dispensing system for aircraft servicing which can be used to withdraw excess fuel and is actuated by a single manual means.

Another object of the invention is to provide an improved fuel dispensing system which can be accommodated on an automotive fuel tanker for servicing aircraft and the like.

Still another object of the invention is to provide a quick and easy fuel dispensing system by which an overloaded airplane fuel tank may be unloaded quickly and accurately to satisfy the weight-load conditions of operation.

Still another object of the invention is to provide a novel valve combination for an eductor defueling system wherein the valves may be placed in effective closed position without the danger of leakage past the valve due to recesses forming sediment traps.

Yet another object of the invention is to provide a tandem valve arrangement wherein one of the valves remains in open operative position while the other is in closed operative position, and vice versa.

These and other objects, features and advantages of the invention will become apparent from the following description and claims when read in conjunction with the accompanying drawings wherein:

Fig. 1 is a partly diagrammatic view of an eductor fueling system used for aircraft fuel servicing;

Fig. 2 is a diagrammatic showing of the fueling operation of the system;

Fig. 3 is similar to Fig. 2 showing the eductor system in operation for unloading of a fuel tank;

Fig. 4 is a pictorial representation in elevation of the tandem ecliptic valve combination; and Fig. 5 is a cross sectional view of the tandem valve combination shown in Fig. 4.

In the presently disclosed structure, a dual valve combination having a common axis of rotation is used to accomplish loading and unloading of fuel from an airplane tank, with one of the valves controlling the flow of fuel from the loading truck or fuel source into the tank, while the other permits withdrawal from the tank into the truck or source or some suitable reservoir.

Referring first to Figs. 2 and 3, there is shown a pump at P, which provides fuel from a source (not shown) through a divided or bifurcated discharge line L, one fork of which $L_1$ has a quick-acting loading valve at $V_1$ and leads to a measuring device or meter at M and then through a delivery hose at H to the delivery nozzle at N, which has appropriate closure means. The second fork $L_2$ of the delivery line L leads to the venturi part of the eductor at E. Downstream of valve $V_1$ there is a bypass B which leads from fork $L_1$ to the suction chamber of jet eductor E and contains a check valve at C opening in the direction of the suction of eductor E.

The jet eductor E empties into its discharge line D through a quick-acting valve $V_2$ and is shown ending upstream of the pump P but could as well end at some suitable reservoir or header. In the operation of the system as set out in Fig. 2, the valve $V_1$ is in open position and valve $V_2$ is closed, so that there is no flow through the check valve at C. When the meter at M indicates that a proper amount of fuel has been provided, the flow through the nozzle N is shut off. In those cases where the meter indicates that an excess of fuel has been provided the fuel tank, the valves $V_1$ and $V_2$ are manipulated so that the former is closed and the latter is placed in open position. This is the situation which exists in Fig. 3, with the check valve C opening in the direction of the suction chamber of the eductor E to become operative.

As will be readily apparent with valve $V_1$ in closed position and valve $V_2$ in open position, the fuel pump provides fuel to the venturi part of the jet eductor and upon the opening of the check valve C, the eduction process becomes operative, and evacuation through the nozzle N is started. In this process, the meter can be used to indicate the amount of fuel pumped out, or should the requirement be such, the entire tank may be defueled.

Referring to Fig. 1, the generalized system disclosed in Figs. 2 and 3, is shown in a preferred construction, with a source of fuel such as a tank, indicated as R, with the pump at P discharging through the discharge line L which divides into forks or lines $L_1$ and $L_2$. The first fork or line $L_1$ contains a quick-acting valve $V_1$ and a meter M before it is joined to a delivery hose H with its nozzle end leading to a fuel tank at T, shown diagrammatically as part of an airplane wing. The second fork or line $L_2$ is shown leading to the venturi connection of eductor E, which has a quick-acting valve $V_2$ in its discharge line D leading to a suitable reservoir, e. g., the tank R. The bypass line B from the fork $L_1$, located downstream from the valve $V_1$, is joined to the eduction chamber of the eductor and is indicated with a check valve at C. Valves $V_1$ and $V_2$ are shown having a common axis of rotation and are joined to each other in tandem arrangement through their valve stems by means of an actuating bar handle indicated at A.

The pictorial representation of the tandem valve arrangement disclosed in Fig. 4 shows the manner in which the bar handle at H is fastened to the valve stems of the valves $V_1$ and $V_2$.

In Fig. 5, there is disclosed a cross section of a tandem ecliptic valve arrangement, showing its joint with the line $L_1$ to valve $V_1$, and the discharge line D to the valve structure at $V_2$. In this figure, the valve $V_1$ is shown in open position and $V_2$ in fully closed position. It is possible to lock the valves in these positions by means of the detent ball and spring arrangement shown adjacent the packing gland nut $G_2$ of valve $V_2$ at 10, with the ball at 11 adapted to fit within the ball receiving depression at 11'.

The valves at $V_1$ and $V_2$ are the so-called ecliptic type having an off-center or oblique axis of rotation. Since these valves are alike, the following description pertains to either. The valve comprises a throttle butterfly valve disc which is pivoted on a bias, but in fully closed position, the butterfly valve disc is perpendicular to the longitudinal axis of the valve chamber. When the valve stem is rotated, the butterfly valve disc in opening describes an ecliptic movement determined by the angle of bias of the pivot or axis of the valve stem, which in the present instance is determined as 17°. In closing, the reverse action takes place, and throughout either opening or closing cycle, the edge of the butterfly valve disc is in contact with a smooth surface so that a cleansing action is performed. As shown, the valves have a common axis of rotation, indicated by the dotted line at X—X.

Each valve consists of a valve stem at 12, which projects through the boss 13 and supports the throttle butterfly valve disc 14, the valve stem pivoting in the bushing or bearing at 15. An appropriate packing gland structure seals the opposite end of the valve stem as indicated by the packing gland nuts, $G_1$ and $G_2$. Around the periphery of the valve 14, there is seated a sealing O-ring 16, which serves to seal the passage leading from either $L_1$ or D. Because of its eccentric mounting in the opening or closing of the valve, the inherent sweeping or cleansing action by the O-ring wipes away any sediment which may have accumulated in the discharge line. When the valves are in closed position, as shown in valve $V_2$, the O-ring seals the discharge line completely without the danger of a sediment trap existing at the periphery of the O-ring. In particular, the bushing or bearing support for the valve stem 12 is downstream of the valve 14, while the other end of the valve stem adjacent the packing gland is upstream of and on the other side of the valve.

In order to provide for quick-acting loading and unloading of fuel, the valves $V_1$ and $V_2$ are placed in tandem arrangement so that by means of a single manual operation of the bar handle at A, it is possible to simultaneously open and close the opposite valves. As disclosed, the handle joined to the valve stem in appropriate manner has two limiting positions determined by the detent ball and spring arrangement, with the supply valve $V_1$ open and the withdrawal valve $V_2$ closed or vice versa. Intermediate positions of the valves in this system are unnecessary.

Thus, there has been shown and described an apparatus by which it is possible to control the amount of fuel withdrawn from an overloaded tank, and in which there is a simultaneous operation of loading and unloading valves by means of one lever. Although the invention is directed generally to the defueling of a tank, with the amount of fuel to be withdrawn controlled by the shut off means on the nozzle of the loading or delivery hose, it is evident that the hose itself also is subject to withdrawal of fuel so long as the eductor or auxiliary pumping means at E is in operation and there is a suction effect produced.

Obviously, many modifications and variations of the invention, as hereinbefore set forth, may be made without departing from the spirit and scope thereof, and therefore only such limitations should be imposed as are indicated in the appended claims.

I claim:

1. In combination in a dispensing system, a source of pressurized fluid, a bifurcated discharge line joined to said source, one fork of said line leading to a delivery hose and the second fork being joined to an eductor system having an eductor with a suction chamber and a discharge line leading therefrom, a bypass from said one fork of said bifurcated discharge line leading to said suction chamber of said eductor system and having a check valve opening in the direction of suction, and a tandem dual valve arrangement located respectively in said one fork of said bifurcated discharge line upstream of said bypass and in said discharge line of said eductor system to permit supply and withdrawal of liquid upon manipulation by a single means comprising a handle interconnecting said dual valve arrangement, the valves of said tandem dual valve arrangement having a common axis of rotation and being bias pivoted.

2. In combination in a dispensing apparatus having an eductor system, a bifurcated flow line connected to a pressurized fluid supply source, one fork of said flow line leading to a delivery means and the other fork leading to said eductor system, said system ending as a discharge line leading to an appropriate reservoir, a tandem dual valve arrangement adapted to be operated simultaneously, located in one fork of said flow line and in said discharge line of said eductor system, and a bypass leading from said one fork of said flow line to said jet eductor system and located downstream of said valve arrangement, said bypass including a check valve opening in the direction of flow into said eductor system, the valves of said arrangement being bias pivoted and having a common axis of rotation and being interconnected by a handle for operation.

3. In a fuel dispensing system having an eductor, the combination of a discharge line leading from a source of fuel supply, said discharge line dividing into two parts, the first part thereof ending as a delivery hose and including a measuring meter adjacent the outlet of said first part of the divided line, said eductor being joined to the second part of said divided discharge line and discharging through a discharge line, a bypass located upstream of said meter leading from said one part of said discharge line and joining the suction chamber of said eductor, said bypass including a check valve opening in the direction of the suction, a tandem valve arrangement located in the discharge line of said eductor and upstream of said bypass in said first part of said divided discharge line, whereby the flow through said discharge line may be controlled by simultaneous operation thereof, and means for the simultaneous operation of said tandem valve arrangement.

4. In a fuel dispensing system as defined in claim 3, said tandem valve arrangement comprising a pair of bias pivoted valves having a common axis of rotation.

References Cited in the file of this patent

UNITED STATES PATENTS

| | | |
|---|---|---|
| 626,477 | Archambault | June 6, 1899 |
| 1,671,069 | De Wein | May 22, 1928 |
| 1,995,634 | Clark | Mar. 26, 1935 |
| 2,675,943 | Daley et al. | Apr. 20, 1954 |
| 2,754,846 | Ray | July 17, 1956 |